US008023903B2

(12) United States Patent
Kerwood

(10) Patent No.: US 8,023,903 B2
(45) Date of Patent: Sep. 20, 2011

(54) COMMUNICATION DEVICE FOR ROCK CLIMBING AND OTHER ACTIVITIES

(76) Inventor: Jason Kerwood, Boulder, CO (US)

( * ) Notice: Subject to any disclaimer, the term of this patent is extended or adjusted under 35 U.S.C. 154(b) by 752 days.

(21) Appl. No.: 12/006,613

(22) Filed: Jan. 4, 2008

(65) Prior Publication Data
US 2009/0305651 A1    Dec. 10, 2009

(51) Int. Cl.
*H04B 1/38* (2006.01)
(52) U.S. Cl. .................. 455/90.3; 455/90.1; 455/90.2
(58) Field of Classification Search .............. 455/90.1, 455/90.2, 90.3
See application file for complete search history.

(56) References Cited

U.S. PATENT DOCUMENTS
2004/0072583 A1*  4/2004  Weng ................... 455/456.3
2007/0257889 A1* 11/2007  Croy .......................... 345/170
* cited by examiner Primary Examiner — Lana Le
Assistant Examiner — Hsin-Chun Liao
(74) Attorney, Agent, or Firm — Emery L. Tracy

(57) ABSTRACT

A communication system for rock climbing and other activities is provided. The communication system comprises a first communication device having a first front surface. A first faceplate is mounted on the first front surface of the first communication device with the first faceplate preferably having three columns. A plurality of depressible status command buttons are mounted on the first front surface of the first communication device outside the first faceplate. A plurality of depressible action command buttons are mounted on the first front surface of the first communication device outside the first faceplate. A depressible variable command button is mounted on the first front surface of the first communication device outside the first faceplate. A depressible confirmation button is mounted on the first front surface of the communication device outside the columns.

11 Claims, 5 Drawing Sheets

FIG. 6
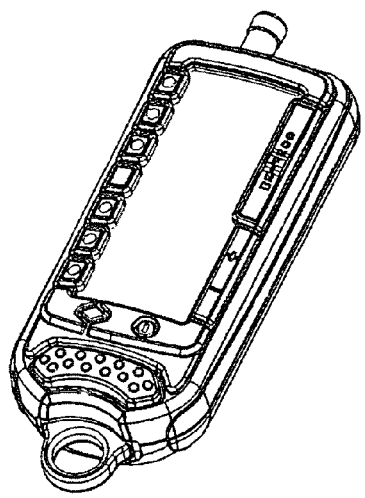
FIG. 7
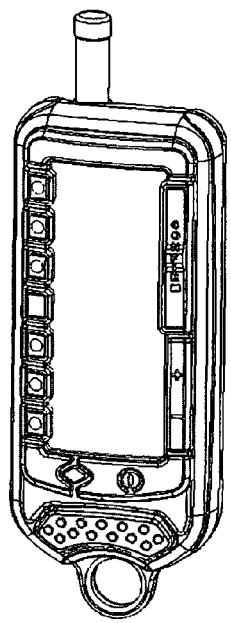
10
10
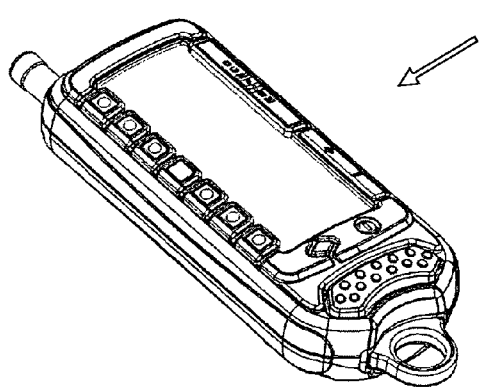
FIG. 8
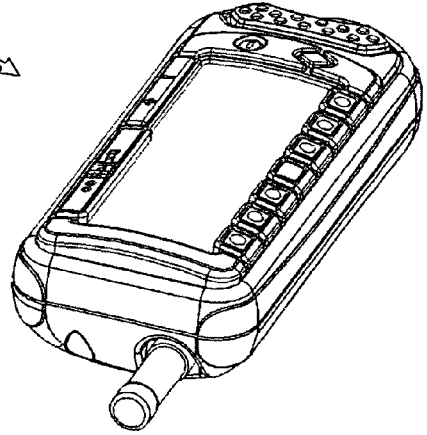
FIG. 9

COMMUNICATION DEVICE FOR ROCK CLIMBING AND OTHER ACTIVITIES

BACKGROUND OF THE INVENTION

1. Field of the Invention

This invention relates generally to a communication device for rock climbing and other activities and, more particularly, the invention relates to a communication device for rock climbing and other activities used to make rock climbing and other similar activities safer by improving the methods in which climbing partners communicate and a variety of activities where voice free, single hand operated communication is desired.

2. Description of the Prior Art

Climbing is a unique, exciting, and challenging endeavor. However, even in the best of conditions, numerous variables exist which result in an inherent risk of serious injury or even death. The goal of any climber, novice or experienced, is to minimize the number of uncontrollable variables by planning for as many different aspects of an outing before departure including bringing the correct amount of food, water, gear, etc. Whether consciously or unconsciously, all successful climbers do this process of preemptive planning in order to both increase the chance of success and decrease the possibility of serious injury.

One such aspect of an outing that has not yet been adequately identified is that of communication. Communication not only has the potential to affect the success of the climb, but also the safety of both climbers. Most experienced rock climbers that use ropes will agree that when separated by as short of a distance as one rope length, the ability to communicate with your partner drops to nearly zero. While verbal communications may work in some situations, the commonly used method of communication between climbing partners is accomplished primarily by tugging on the rope.

Unfortunately, tugging on the rope is an extremely unreliable and difficult to interpret method of communication. Was that two tugs or three tugs? Did four tugs mean belay on or belay off? Do they need slack? Was that one long tug or two short tugs? These questions can never be answered with certainty solely from the tug of a rope, and an incorrect interpretation could result in death.

The possibility of such a serious consequence due to lack of communication is something that should be unacceptable to the average climber. With today's technological advances in the communication industry, specifically in wireless communications and walkie-talkies, one must ask why climbers do not take advantage of these valuable resources. The answer is clear: no communication device has ever been specifically designed for the use of rock climbing and other similar climbing activities.

Accordingly, there exists a need for a communication device designed to meet the unique needs of a climber including, but not limited to, voice-free, single hand operation, operational ability while attached to a harness or gear sling, and durability designed to endure a variety of climbing environments.

SUMMARY

The present invention is a communication system for rock climbing and other activities. The communication system comprises a first communication device having a first front surface. A first faceplate is mounted on the first front surface of the first communication device with the first faceplate having three columns. A plurality of depressible status command buttons are mounted on the first front surface of the first communication device outside the first faceplate. A plurality of depressible action command buttons are mounted on the first front surface of the first communication device outside the first faceplate. A depressible variable command button is mounted on the first front surface of the first communication device outside the first faceplate. A depressible confirmation button is mounted on the first front surface of the communication device outside the columns. Other options, types, and orientations of status, action, and confirmation command buttons exist that can be mounted on the first front faceplate.

In addition, the present invention includes a method for communicating between at least two rock climbing persons. The method comprises providing a first communication device, providing a second communication device with the first communication device and the second communication device communicatable with each other, depressing a command button on the first communication device, and illuminating a command symbol on the second communication device.

The present invention further includes a communication system for rock climbing and other activities. The communication system comprises a first communication device having a first faceplate divided into three columns. A second communication device is communicatable with the first communication device with the second communication device having a second faceplate divided into three columns. A plurality of depressible status command buttons are mounted on each of the communication devices outside the faceplates. A plurality of depressible action command buttons are mounted on each of the communication devices outside the faceplates. A depressible variable command button is mounted on the front surface of each of the communication devices outside the faceplates. A depressible confirmation button is mounted on each of the communication devices outside the faceplates wherein depressing one of the command buttons on the first communication device communicates the desired command to the second communication device that visually indicates the desired command on the second faceplate of the second communication device and/or indicates the desired command by an audible sound and/or vibration.

BRIEF DESCRIPTION OF THE DRAWINGS

FIGS. 6-9 are various perspective views illustrating the communication device for rock climbing and other activities, constructed in accordance with the present invention; and FIG. 10 is a perspective view illustrating the communication device for rock climbing and other activities, constructed in accordance with the present invention, with an extendable loop for securement to a carabineer or the like.

DETAILED DESCRIPTION OF THE PREFERRED EMBODIMENTS

As illustrated in FIGS. 1-10, the present invention is a communication device, indicated generally at 10, for rock climbing and other activities. While the communication device 10 will be described as being used specifically for rock climbing, it will be understood that the communication device 10 can be used for other activities including, but not limited to, diving, hiking, etc.

The communication device 10 of the present invention provides a method for voice free, single hand operation communication using a series of corresponding buttons, shapes, lights, and sounds, to relay a climber's status and commands between two distinct communication devices. All appropriate electronics are included in the communication device 10 allowing the communication device 10 to transmit and receive from other communication devices 10. An example orientation of these user interfaces for rock climbing activities are best illustrated in FIG. 1 which depicts an example of a faceplate 12 of the communication device 10.

It should be noted that in a preferred embodiment of the communication device 10 of the present invention, there are at least two identical communication devices 10 communicatable with each other. One person will have one of the communication devices 10 and the other person will have the other communication device 10 to communicate with each other during the rock climbing or other activity.

Figure 1:
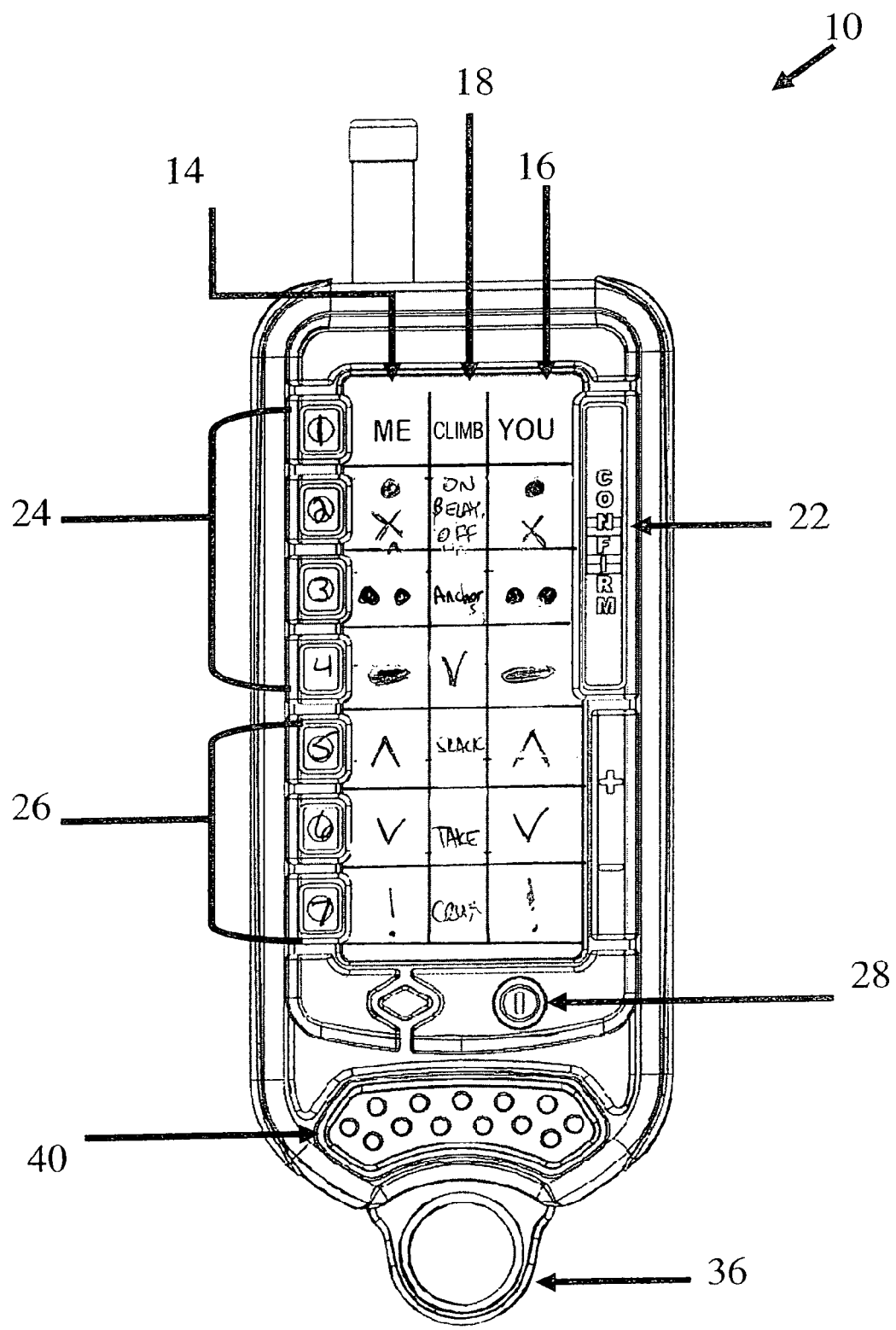
FIG. 1 is a front view illustrating a communication device for rock climbing and other activities, constructed in accordance with the present invention.
Figures 2, 3:
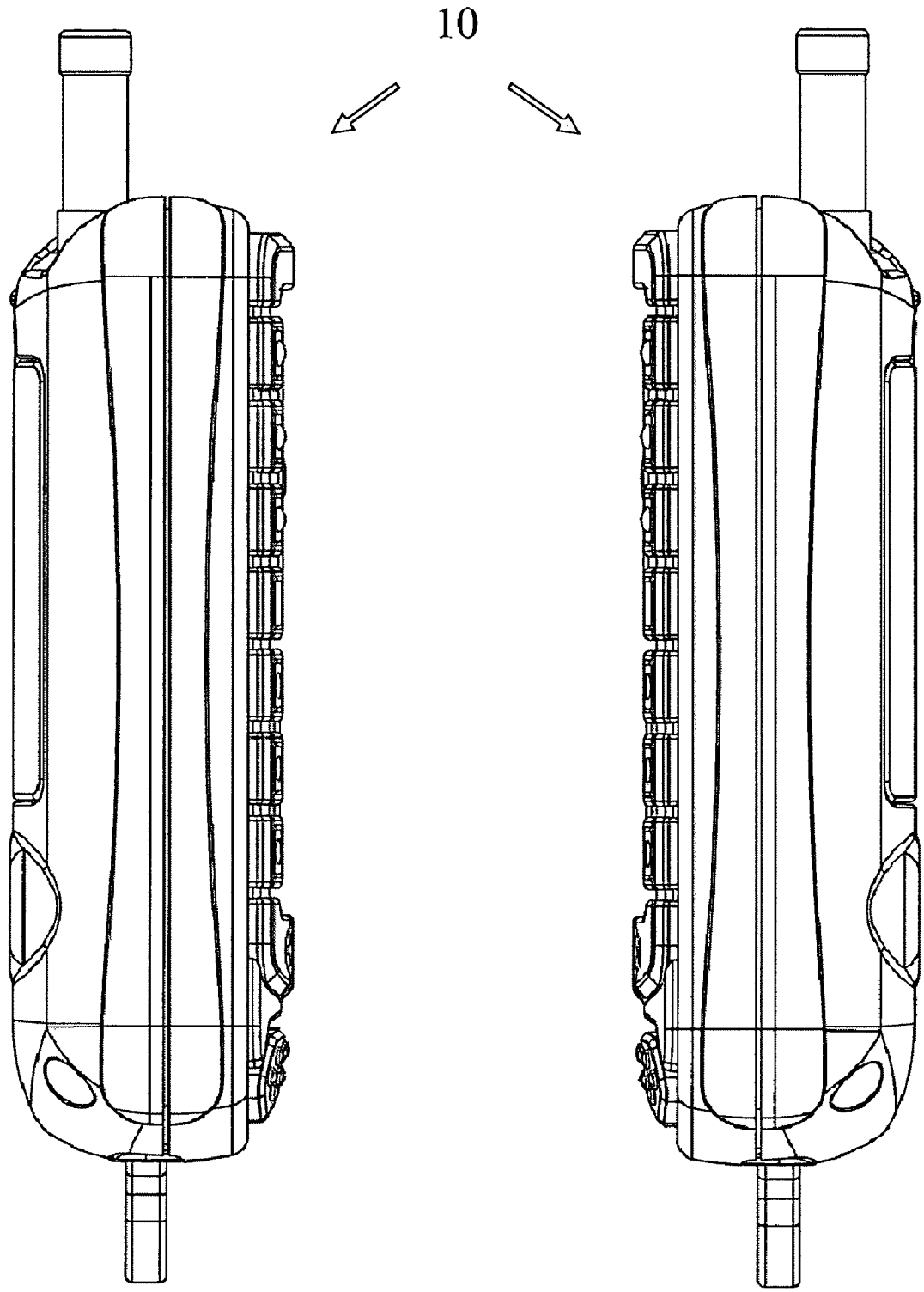
FIG. 2 is a left side view illustrating the communication device for rock climbing and other activities, constructed in accordance with the present invention.
FIG. 3 is a right side view illustrating the communication device for rock climbing and other activities, constructed in accordance with the present invention.
Figure 4:
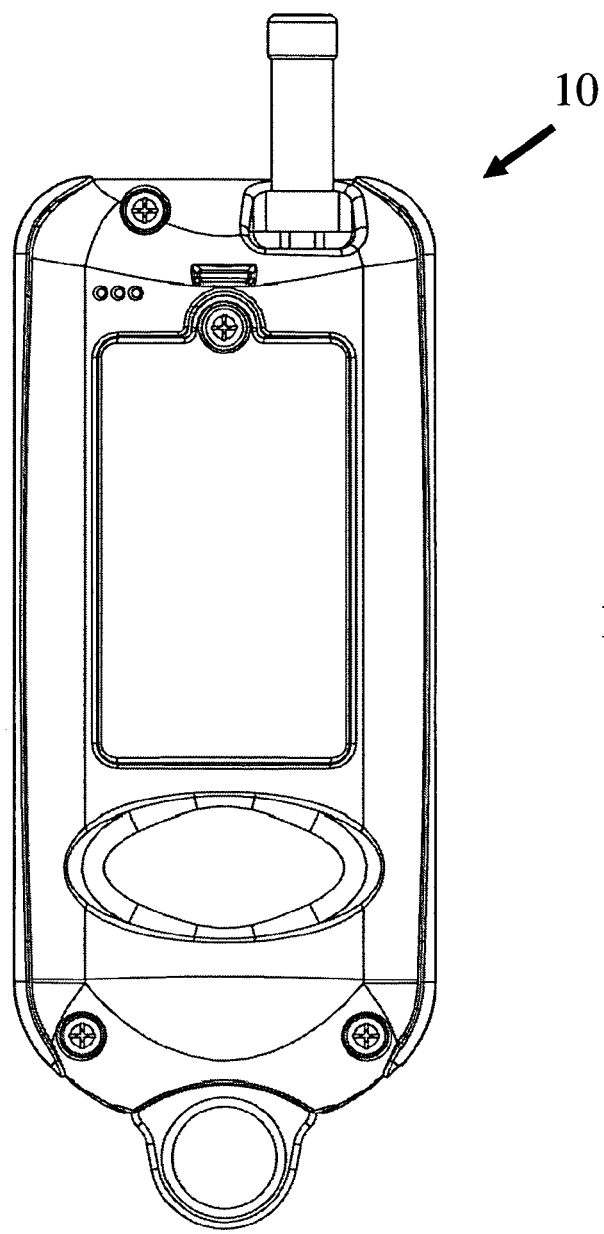
FIG. 4 is a rear view illustrating the communication device for rock climbing and other activities, constructed in accordance with the present invention.
Figure 5:
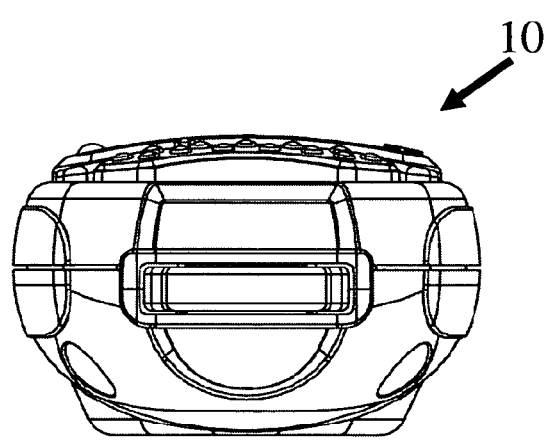
FIG. 5 is an end view illustrating the communication device for rock climbing and other activities, constructed in accordance with the present invention.
Figure 10:
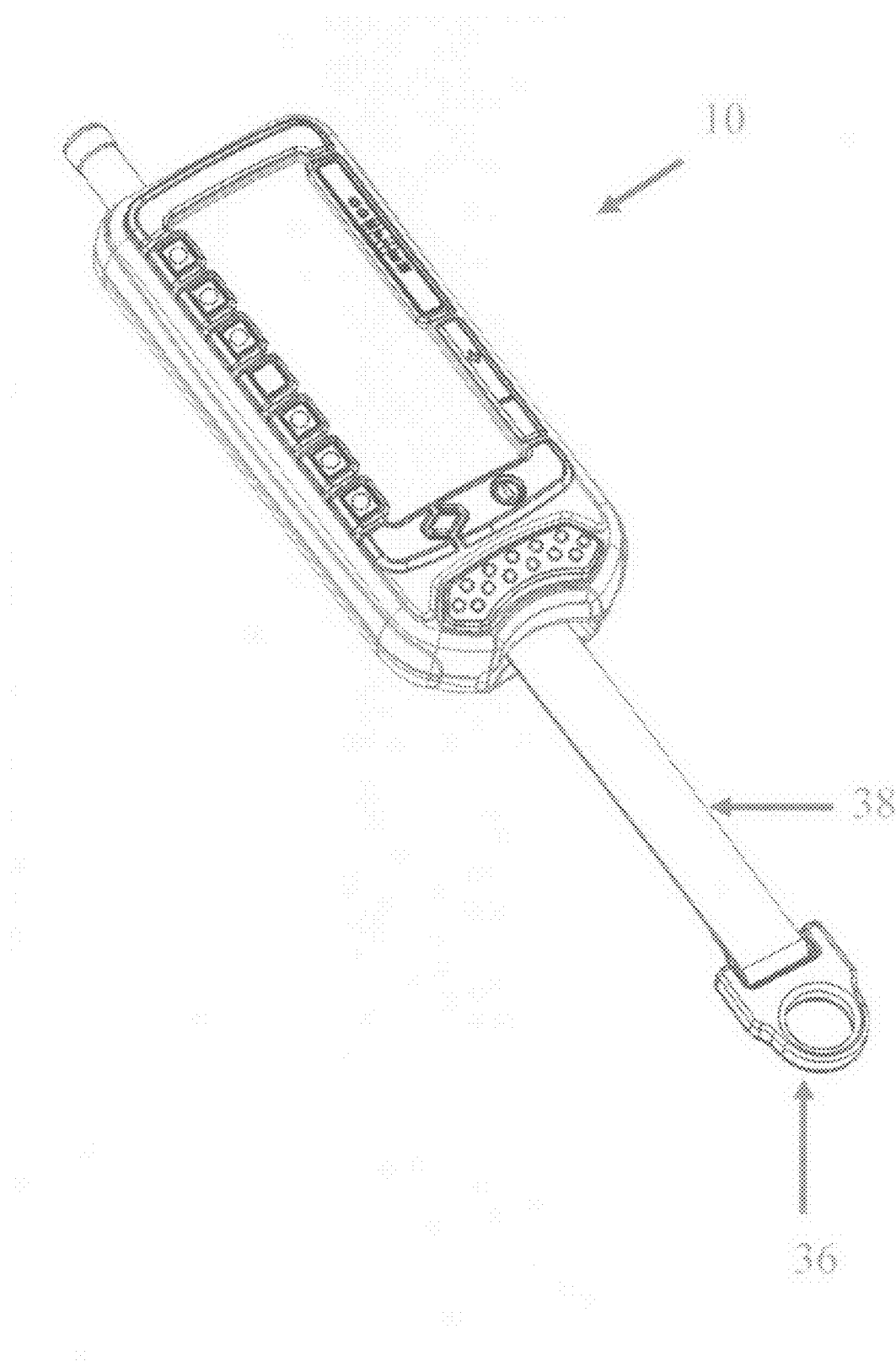

As illustrated in FIG. 1, the faceplate 12 of the communication device 10 of the present invention serves as the visual interface between the communication device 10 and the user. The faceplate 12 is preferably provided in three columns, namely a first column 14, a second column 16, and a third column 18. The outer columns, i.e., the first column 14 and the second column 16, preferably represent the climbing status columns of both the user and their partner, labeled "ME" and "YOU" respectively. The shapes or symbols in the first column 14 and the second column 16 will illuminate when the corresponding command button is depressed. The middle column, i.e., the third column 18, preferably depicts the various commands associated with each shape and clearly states each command that can be relayed between communication devices 10.

The command buttons (labeled "1"-"7") of the communication device 10 of the present invention are used to update a status or issue a command to the user's partner. The button 22 labeled "OK" is the confirmation button verifying the reception of a command. The status command buttons 24 (labeled "1"-"3") relating to the status of the user (called Status Commands) are preferably grouped together at the top of the communication device 10. The Status Commands ("Climb" "Belay On/Off" and "Anchors") facilitate communication between partners as they transfer from climber to belayer and vice versa. Clear and concise communication during this transition is crucial to the safety of both partners. Therefore, the Status Commands require the use of the "OK" button 22. Also, when the Status Commands are issued, besides the usual indicators, the communication device 10 emits a corresponding and distinct tone and/or vibration.

Located below the status commands of the communication device 10 of the present invention are preferably action command buttons 26 (labeled "4"-"7") typically issued during the actual movement of climbing (called While Climbing Commands). Typically, the While Climbing Commands are issued by the partner climbing and do not require the use of the "OK" or confirmation button 22 from the receiving partner. When issued, the four While Climbing Commands each have their own unique sound allowing the user to distinguish each command not only from each other but also from the sound emitted by the Status Commands. The issuance of a While Climbing Command may also be indicated by a vibration of the receiving climber's communication device.

Description of Operation:
Starting the Climb:

After fully understanding how to operate the communication device 10 of the present invention, both climbing partners power on their respective communication device 10 by depressing the power button (not shown). As the communication device 10 powers on, an auditory noise is generated and all of the LED's in the device flash briefly to verify that all are still functional. After this initial flash, a power LED 28 will remain on until the communication device 10 is powered off in order to alert the user of the communication device's 10 activity.

For example, it is decided that Climber A will lead climb the first pitch while Climber B belays. To indicate Climber A's intention to climb, Climber A depresses and holds, for two seconds, the Climb button (labeled "1"). Climber B will verify that Climber B is ready to belay Climber A by pressing and holding, for two seconds, the Belay button (labeled "2"). These and all subsequent command inputs are accompanied by a relatively loud, adjustable auditory noise that acts as an alert to a status update.

At this point, on Climber A's communication device 10, the "ME" column heading and the circle in the "YOU" column start to flash. Climber B's communication device 10 interface displays a flashing circle in the "ME" column and a flashing "YOU" column header.

The flashing of the LED's continue until confirmation of receipt is acknowledged by depressing and holding, for two seconds, the "OK" button 22. When Climber A depresses and holds the confirm button 22, they are acknowledging that Climber B has put them on belay. This acknowledgment results in a continuously lit circle in the "YOU" column. When Climber B presses and holds the "OK" button 22, they are acknowledging Climber A's intention to climb. This results in a continuously lit "YOU" column header.

During the Climb:

At this point, Climber A is ready to begin climbing (a climber does not begin climbing until the Belay On circle is continuously lit in the "YOU" column, i.e. your partner has you on belay). As Climber A climbs, they may or may not need to issue the While Climbing commands such as "SLACK," "TAKE," and "CRUX".

If Climber A needed slack in the rope at some point during their lead climb, they simply push and hold, for two seconds, the Slack button, labeled "5". The corresponding triangle will flash continually for ten seconds and an audible sound will issue, alerting Climber B of the need for slack. The command receipt is acknowledged by Climber B slowly giving slack to Climber A. Notice that receipt confirmation is not acknowledge by the "OK" button. Recognition of the command is instead evident from the slack that is currently being given. When Climber A no longer needs slack, they would again push and hold button "5" resulting in an auditory noise and a dimmed out triangle on both partners communication devices 10. This same method of command issue and acknowledgment is also used to designate when Climber A needs to have the rope taken in tightly by Climber B using the "TAKE" command, labeled "6".

Ideally, Climber A will have at least a general idea of where the hardest parts of the climb will occur. It is at these more difficult parts of a climb (i.e. crux) that a climber has a greater chance of falling. Therefore, as Climber A approaches the crux section(s) of a climb, they will forewarn Climber B of the increased fall potential by pressing and holding, for two seconds, the "CRUX" button, labeled "7". This command issue results in a flashing exclamation symbol lasting a few seconds and the issuance of an audible sound. Again, acknowledgment of receipt by means of the confirmation button 22 is not necessary for this command.

The "V" command on the communication device 10 of the present invention stands for a variable command. This meaning of the "V" command may change throughout a climb, depending on a prearranged agreement between climbing partners. Although this command is generally intended to be a While Climbing command, it will require acknowledgement of receipt using the confirmation button 22 as if it were a Status Command.

Transferring Roles:

Eventually as Climber A climbs, they will reach a point where they must anchor themselves to the rock before they run out of excess rope. To begin the transition from lead climber to belayer, Climber A must first anchor themselves to the rock. Once Climber A has securely and redundantly anchored themselves, they will transmit this status change to Climber B by pressing and holding, for two seconds, the "ANCHORS" button labeled "3."

After Climber A presses the "ANCHORS" button, Climber B notices the continually flashing light and corresponding auditory alert and presses the "OK" button on their communication device 10 resulting in a continuously lit double circle. Based on this communication device configuration, both climbers now fully understand that the transition between climber to belayer and vice versa has begun. Knowing that Climber A is anchored and presently no longer intends to climb, Climber B presses and holds, for two seconds, the "BELAY" button labeled "2." This input cycles the communication device 10 between the currently lit "Belay On" circle to a flashing "Belay Off" "X."

After double checking their anchors, and acknowledging that they will soon be off belay, Climber A presses the "OK" button, resulting in a continuously lit "X." Climber A also presses and holds, for two seconds, the "CLIMB" button, labeled "1," to turn off the currently lit "ME" column header. This results in an auditory noise; however, no confirmation from Climber B is needed. This is the final indicator that Climber A is anchored and no longer climbing. Only when Climber B notices the dimmed out "YOU" column header and the lit up "ANCHORS" status will they take Climber A off belay.

It is now Climber A's turn to belay Climber B up the rock face. When Climber A is ready and has put Climber B on belay, they will press and hold for two seconds the "BELAY" button labeled "2." Climber B acknowledges that they are on belay by pressing the "OK" button 22.

Finally, when Climber B is ready to climb, they will relay this status update by pressing and holding for two seconds the "CLIMB" button, labeled "1." Climber A double checks anchors and belay setup and then presses the "OK" 22 button to acknowledge receipt of Climber B's intention to climb. At this point, it is clearly understood that Climber B intends to start climbing.

During Climber B's climb up to Climber A's position, While Climbing commands will be issued in the same manner as described above. Eventually Climber B reaches Climber A's location, the communication devices 10 are reset, and the cycle is repeated in the same manner as previously described until each climber is on the summit.

Depending on the descent of the route, the communication device 10 (specifically the "V" button) can prove to be useful to maintain clear communication during the rappel.

Communication Device Button Operation Summary:

Buttons 1-7 and the "OK" button 22 are depressed and held for two seconds for operation.

Buttons 1-3 (the Status Commands): all emit the same, brief sound when operated. When the buttons are depressed and held for two seconds, a brief audible sound occurs together with continuous flashing of corresponding shape until the "OK" button 22 of the corresponding communication device 10 is depressed and held for two seconds. This confirmation is noted by another audible sound. Upon confirmation, corresponding shapes stay continually lit. Once a shape is lit, it can be dimmed by depressing and holding for two seconds the corresponding button (does not apply to Button 2). This results in a brief audible sound. No confirmation necessary.

If "Belay On" circle is continually lit and Button 2 is again pressed and held for two seconds, an audible noise is emitted and the "Belay On" circle is dimmed as the "Belay Off" "X" begins to flash. This becomes continually lit "Belay Off" "X" after confirmation. Finally, Button 2 is again pressed and held for two seconds, a brief sound is emitted and the "Belay Off" "X" cycles off.

Button 4 (Variable Button): emits a distinct sound when operated. When depressed and held for two seconds, a brief audible sound is issued and the corresponding shape flashes until "OK" of the corresponding communication device 10 is depressed and held for two seconds. This confirmation is noted by another brief, audible sound. Upon confirmation, the corresponding shape stays continually lit. Once a shape is lit, can be dimmed by depressing and holding for two seconds the corresponding button. This results in a brief audible sound. No confirmation is necessary.

Buttons 5-7 (The While Climbing Commands): each emits a distinct, brief sound when operated (unique from Status Commands sound). When depressed and held for two seconds, a brief audible sound is issued and a corresponding shape flashes for ten seconds and then remains lit, no confirmation necessary. Once a shape is lit, it can be dimmed by depressing and holding for two seconds the corresponding button. This results in a brief audible sound. No confirmation is necessary.

"OK" Button (Confirmation Button): When a shape corresponding to a Status Command or to Button 4 is flashing pushing and holding the "OK" Button 22 for two seconds results in a brief audible sounds and a continually lit shape. If the "OK" Button 22 is depressed and held for two seconds at a time when there is not a flashing Status Command shape or a flashing "Variable" bar, nothing happens.

The communication device 10 of the present invention further includes a retractable loop 36 for securing the communication device 10 to a carabineer or the like. The retractable loop 36 is secured to a strap 38 coiled within the communication device 10. As the loop 36 is pulled in a general direction from the communication device 10, the strap 38 is releasably locked at the desired length. To retract the strap 38 back into the communication device 10, the user simply depresses the retract button 40. The strap 38 then retracts back into the communication device 10 until the loop 36 rests against the communication device 10.

The communication device 10 of the present invention includes the necessary electronic components to function and operate as a two-way communication device, as described above. An antenna is included in the communication device 10 to improve transmission and receptions between a pair of communication devices.

In addition to the features described above, the communication device of the present invention can include features such as adjustable volume, a vibration setting, an LCD display, touch screen interface, etc.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A method for communicating between at least two rock climbing persons, the method comprising:
   providing a first communication device;
   providing a second communication device, the first communication device and the second communication device communicatable with each other;
   providing a first column having a plurality of illuminatable symbols, the first column associated with the first communication device;
   providing a second column labeled "YOU", the second column having a plurality of illuminatable symbols, the second column associated with the second communication device;
   providing a third column between the first column and the second column, the third column depicting various commands associated with a symbol in the first column and second column;
   creating a row with an illuminatable symbol in the first column, an illuminatable symbol in the second column, and a command in the third column create a row;
   aligning the row with a status command button, an action command button, or the variable command button;
   depressing a command button on the first communication device; and
   illuminating a command symbol on both the first communication device and the corresponding command symbol of the second communication device.

2. The method of claim 1 and further comprising:
   associating each status command button with an illuminatable status command symbol positioned in the first column and the second column;
   associating each action command button with an illuminatable action command symbol positioned in the first column and the second column; and
   associating the variable command button with an illuminatable symbol positioned in the first column and the second column.

3. The method of claim 1 and further comprising:
   securing a retractable loop to a coiled strap, the strap extendable from and retractable into the first communication device.

4. A method for communicating between at least two rock climbing persons, the method comprising:
   providing a first communication device;
   providing a second communication device, the first communication device and the second communication device communicatable with each other;
   providing a first column having a plurality of illuminatable symbols, the first column associated with the first communication device;
   providing a second column having the plurality of illuminatable symbols, the second column associated with the second communication device;
   providing a third column between the first column and the second column, the third column depicting various commands associated with a symbol in the first column and second column;
   creating a row with an illuminatable symbol in the first column, an illuminatable symbol in the second column, and a command in the third column;
   aligning the row with a status command button, an action command button, or the variable command button;
   depressing a command button on the first communication device; and
   illuminating a command symbol on both the first communication device and the corresponding command symbol of the second communication device.

5. The method of claim 4 and further comprising:
   associating each status command button with an illuminatable status command symbol positioned in the first column and the second column;
   associating each action command button with an illuminatable action command symbol positioned in the first column and the second column; and
   associating the variable command button with an illuminatable symbol positioned in the first column and the second column.

6. The method of claim 4 and further comprising:
   securing a retractable loop to a coiled strap, the strap extendable from and retractable into the first communication device.

7. The method of claim 4 wherein the illuminatable symbol in the first column in a particular row is identical to the illuminatable symbol in the second column in the same row.

8. A communication system for rock climbing and other activities, the communication system comprising:
   a first communication device;
   a second communication device, the first communication device and the second communication device communicatable with each other;
   a first column having a plurality of illuminatable symbols, the first column associated with the first communication device;
   a second column having the plurality of illuminatable symbols, the second column associated with the second communication device;
   a third column between the first column and the second column, the third column depicting various commands associated with a symbol in the first column and second column;
   wherein an illuminatable symbol in the first column, an illuminatable symbol in the second column, and a command in the third column create a row;
   wherein the row is aligned with a status command button, an action command button, or the variable command button;
   wherein upon depressing a command button on the first communication device, a command symbol on both the first communication device and the corresponding command symbol of the second communication device are illuminated.

9. The communication system of claim 8 wherein each status command button is associated with an illuminatable status command symbol positioned in the first column and the second column, each action command button is associated with an illuminatable action command symbol positioned in the first column and the second column, and the variable command button is associated with an illuminatable symbol positioned in the first column and the second column.

10. The communication system of claim 8 and further comprising:
   a retractable loop secured to a coiled strap, the strap extendable from and retractable into the first communication device.

11. The communication system of claim 8 wherein the illuminatable symbol in the first column in a particular row is identical to the illuminatable symbol in the second column in the same row.

* * * * *